(12) United States Patent
Inohiza

(10) Patent No.: US 9,883,019 B2
(45) Date of Patent: Jan. 30, 2018

(54) MOBILE COMMUNICATION TERMINAL AND SOFTWARE UPDATE METHOD

(75) Inventor: Hirohiko Inohiza, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1079 days.

(21) Appl. No.: 11/912,868

(22) PCT Filed: Apr. 20, 2006

(86) PCT No.: PCT/JP2006/308352
§ 371 (c)(1),
(2), (4) Date: Oct. 26, 2007

(87) PCT Pub. No.: WO2006/118045
PCT Pub. Date: Nov. 9, 2006

(65) Prior Publication Data
US 2009/0088145 A1    Apr. 2, 2009

(30) Foreign Application Priority Data
Apr. 28, 2005    (JP) ................. 2005-131863

(51) Int. Cl.
H04M 3/00 (2006.01)
H04M 1/725 (2006.01)
G06F 9/445 (2006.01)

(52) U.S. Cl.
CPC .......... *H04M 1/72525* (2013.01); *G06F 8/65* (2013.01)

(58) Field of Classification Search
CPC .. H04W 8/245; H04W 8/265; H04M 1/72525
(Continued)

(56) References Cited

U.S. PATENT DOCUMENTS 4,138,718 A * 2/1979 Toke ................. G05B 19/4083
                                                  700/169
5,956,656 A * 9/1999 Yamazaki ............ G08B 3/1058
                                                  340/7.55
(Continued)

FOREIGN PATENT DOCUMENTS

CN    1271888 A    11/2000
JP    10-289146    10/1998
(Continued)

OTHER PUBLICATIONS

Chinese language office action and its English language translation for corresponding Chinese application 200680014084.8.

*Primary Examiner* — Nghi H Ly
(74) *Attorney, Agent, or Firm* — Studebaker & Brackett PC

(57) ABSTRACT

The present invention has an object to prevent an automatic download from overlapping usage of the mobile communication terminal completely or as much as possible.
In order to achieve the above-described objective, the present invention provides a mobile communication terminal includes: a wireless communication portion; and a control portion which downloads software via the wireless communication portion from a software distribution apparatus connected to a network, wherein the control portion, when an update operation is conducted by using the downloaded software, displays a screen indicating end of operations of system software of the mobile communication terminal.

24 Claims, 7 Drawing Sheets

(58) Field of Classification Search
USPC .............. 455/419, 418, 420, 550.1, 566
See application file for complete search history.

(56) References Cited

U.S. PATENT DOCUMENTS

| | | | |
|---|---|---|---|
| 6,367,080 B1* | 4/2002 | Enomoto et al. ............. 725/112 |
| 6,631,313 B2* | 10/2003 | Hayashi et al. ................. 701/1 |
| 6,836,656 B2* | 12/2004 | Nakae et al. .................. 455/418 |
| 7,076,675 B2* | 7/2006 | Martinez Perez et al. ... 713/324 |
| 7,289,817 B2* | 10/2007 | Chun ............................ 455/466 |
| 7,328,049 B2* | 2/2008 | Chanut ........................ 455/574 |
| 7,385,635 B2* | 6/2008 | Kobayashi et al. ..... 348/231.99 |
| 7,634,261 B2* | 12/2009 | Goto ............................ 455/419 |
| 2002/0095425 A1* | 7/2002 | Abu-Husein ................. 707/100 |
| 2002/0103578 A1* | 8/2002 | Hayashi ................. G01C 21/26 701/1 |
| 2003/0037124 A1* | 2/2003 | Yamaura et al. ............ 709/219 |
| 2003/0069008 A1* | 4/2003 | Nakazawa et al. ........... 455/419 |
| 2003/0167230 A1* | 9/2003 | McCarthy ....................... 705/40 |
| 2004/0047304 A1* | 3/2004 | Takahashi et al. ........... 370/310 |
| 2004/0092279 A1* | 5/2004 | Yoshikawa ................... 455/514 |
| 2004/0261073 A1* | 12/2004 | Herle ........................ G06F 8/65 717/173 |
| 2005/0090262 A1* | 4/2005 | Hamano ........... H04W 36/0011 455/445 |
| 2006/0073785 A1* | 4/2006 | Klassen et al. .............. 455/3.01 |

FOREIGN PATENT DOCUMENTS

| | | | | |
|---|---|---|---|---|
| JP | 2000-069190 | | 3/2000 | |
| JP | 2001-078258 | | 3/2001 | |
| JP | 2002-111573 | | 4/2002 | |
| JP | 2002-112349 | | 4/2002 | |
| JP | 2003-030533 | | 1/2003 | |
| JP | 2003-087863 | | 3/2003 | |
| KR | 20040010948 A | * | 2/2014 | ............. H04W 8/24 |

* cited by examiner

MOBILE COMMUNICATION TERMINAL AND SOFTWARE UPDATE METHOD

TECHNICAL FIELD

The present invention relates to a mobile communication terminal and a software update method.

Priority is claimed on Japanese Patent Application No. 2005-131863, filed Apr. 28, 2005, the content of which is incorporated herein by reference.

BACKGROUND ART

In conventional cases, in order to update system software of a mobile communication terminal such as a cellular phone, it is necessary to connect the mobile communication terminal to a PC (Personal Computer), in which software dedicated to download is installed via a special cable and the system software is downloaded to the mobile communication terminal by activating download software that is dedicated to downloading software. However, in such a method, it is necessary for a user to prepare both the PC in which the download software is installed and use the special cable as described above. This is a problem because it is very inconvenient.

In order to solve this problem, Patent Document 1 (Unexamined Japanese Patent Application, First Publication No. 2001-078258) discloses a technique in which system software is automatically downloaded via a network from a system software distribution center connected to a communication network. In accordance with this technique, it is possible to download the system software to the mobile communication terminal without setting up a PC in which the download software is installed and using a special cable as described above. However, while downloading, usage of the mobile communication terminal by the user is prevented (a state of the mobile communication terminal is set so as to be unusable). Moreover, there is another problem in which downloading can be interrupted due to a shortage of power from a battery while downloading. In Patent Document 2 (Japanese Patent Unexamined Application, First Publication No. 2002-111573), in order to solve such the problem of low-battery, a technique is disclosed in which the system software is only downloaded if the mobile communication terminal is in a charged state.

In accordance with the technique disclosed in the above-described Patent Document 2, it is certain that an interruption of downloading due to a low-battery is prevented because the system software is automatically downloaded while the mobile communication terminal is in a charged state. However, there are cases in which the user would like to operate the mobile communication terminal while charging the battery, for example, receive an incoming call or receive email. Therefore, in such cases, even by using the technique disclosed in the above-described patent document 2, the usage of the mobile communication terminal is limited if the download is started. Therefore, even by using the technique disclosed in the above-described patent document 2, the problem of preventing the usage of the mobile communication terminal by the user is not solved.

DISCLOSURE OF INVENTION

The present invention has been conceived in order to solve the above-described problem, and has an object to prevent an automatic download from overlapping with the usage of the mobile communication terminal completely or as much as possible.

In order to achieve the above-described objectives, a mobile communication terminal of the present invention is characterized by including: a wireless communication portion; and a control portion which downloads software via the wireless communication portion from a software distribution apparatus connected to a network, wherein the control portion shows a screen indicating end of operations of system software of the mobile communication terminal when an update operation is conducted by using the downloaded software.

Moreover, a mobile communication terminal of the present invention is characterized by the control portion which downloads the software when a command is received which turns off power.

Moreover, a mobile communication terminal of the present invention is characterized by the control portion which downloads the software when a decision operation of updating the software is conducted after accessing a software update site.

Moreover, a mobile communication terminal of the present invention is characterized by the control portion which downloads the software when a decision operation to update the software is conducted after receiving a notification of new software being available.

Moreover, a mobile communication terminal of the present invention is characterized by the control portion which, when an update operation is conducted by using the downloaded software, shows a screen indicating end of operations of the system software of the mobile communication terminal and turns off a function of detecting an incoming call.

Moreover, a mobile communication terminal of the present invention is characterized by the control portion which, when an update operation is conducted by using the downloaded software, shows a screen indicating end of operations of the system software of the mobile communication terminal and turns off a function of generating sounds.

Moreover, a mobile communication terminal of the present invention is characterized by further including a remaining battery power detection portion which detects remaining power in a battery, wherein the control portion downloads the software if the control portion detects that the remaining power is sufficient for downloading.

Moreover, a mobile communication terminal of the present invention is characterized by the control portion which finishes operations of the system software of the mobile communication terminal after a download of the software has been finished.

Moreover, a mobile communication terminal of the present invention is characterized by the software which is system software.

Moreover, a software updating method of the present invention is characterized by including steps of: downloading software via wireless communication from a software distribution apparatus which is connected to a communication network; and displaying a screen indicating end of operations of system software of a mobile communication terminal if an update operation is conducted by using the downloaded software.

Moreover, a software updating method of the present invention is characterized in that the software can be downloaded when the power is turned off.

Moreover, a software updating method of the present invention is characterized in that the software can be downloaded when a decision operation of updating the software is conducted after accessing a software update site.

Moreover, a software updating method of the present invention is characterized in that the software is downloaded when a decision operation of updating the software is conducted after receiving a notification of new software being available.

Moreover, a software updating method of the present invention is characterized in that when an update operation is conducted by using the downloaded software, a screen indicating end of operations of system software of the mobile communication terminal is shown and a function of detecting an incoming call is turned off.

Moreover, a software updating method of the present invention is characterized in that when an update operation is conducted by using the downloaded software, a screen indicating end of operations of system software of the mobile communication terminal is shown and a function of generating sounds is turned off.

Moreover, a software updating method of the present invention is characterized in that the software is downloaded when remaining power in a battery is sufficient for downloading the software.

Moreover, a software updating method of the present invention is characterized in that operations of the system software of the mobile communication terminal are turned off after a download of the software has been finished.

Moreover, a software updating method of the present invention is characterized in that the software is system software.

In accordance with the present invention, an automatic download is prevented from overlapping with usage of the mobile communication terminal completely or as much as possible because the automatic download is conducted when the user is not using the mobile communication terminal.

BEST MODE FOR CARRYING OUT THE INVENTION (First Embodiment)

Hereinafter, a first embodiment of the present invention is explained in reference to drawings.

Figure 1:
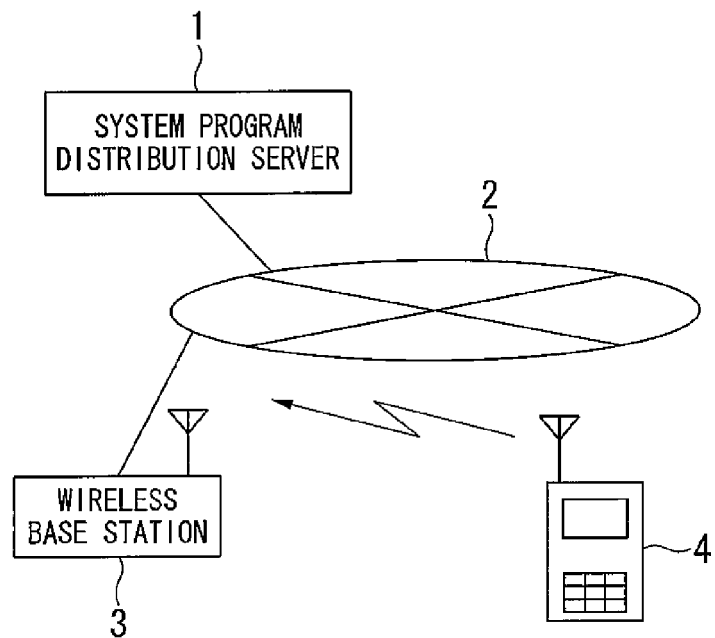
FIG. 1 is an outline constitutional drawing of a distribution system which distributes software (system software) to a mobile communication terminal of a first embodiment of the present invention.

FIG. 1 is an outline constitutional drawing of a distribution system which distributes software to a mobile communication terminal of the first embodiment of the present invention. It should be noted that in the following explanation, system software is an example of the software which is distributed to the mobile communication terminal. In FIG. 1, a reference numeral 1 is system software distribution server (software distribution apparatus), 2 is a communication network, 3 is a wireless base station and 4 is the mobile communication terminal.

The system software distribution server 1 is connected to the communication network 2 and stores the system software which is distributed to the mobile communication terminal 4. When the mobile communication terminal 4 accesses the system software distribution server 1, the system software distribution server 1 transmits predetermined system software to the mobile communication terminal 4 via the communication network 2 and the wireless base station 3.

The communication network 2 is a national telephone network extending and covering a large area. The wireless base station 3 is a relay station which is set at each predetermined service area, and which connects wireless communication between the communication network 2 and the mobile communication terminal 4 which is included in the service area.

The mobile communication terminal 4 is a cellular phone, a PHS (Personal Handy phone System), and the like which is obtained and carried by the user, and conducts a telephone call, data communication, and the like via the wireless communication network 2 by communicating with the wireless base station 3 via wireless communication.

Figure 2:
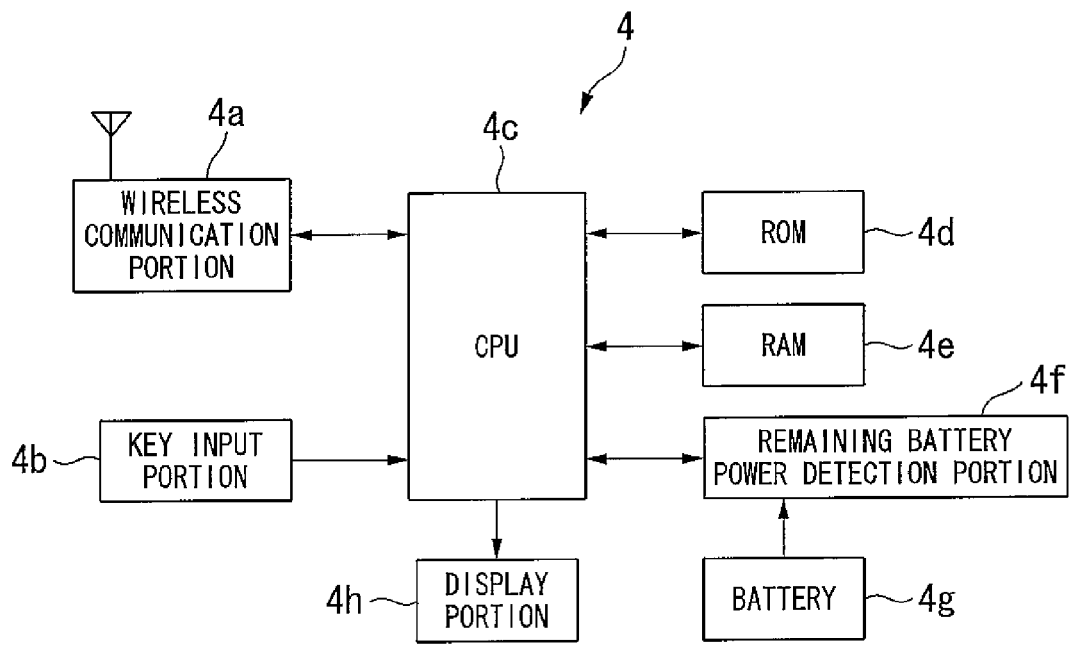
FIG. 2 is a constitutional block diagram of a mobile communication terminal of a first embodiment of the present invention.

As shown in FIG. 2, this mobile communication terminal 4 is constituted from a wireless communication portion 4a, a key input portion 4b, CPU (control portion) 4c, ROM (Read Only Memory) 4d, RAM (Random Access Memory) 4e, a remaining battery power detection portion (remaining battery power detection portion) 4f, a battery (battery) 4g and a display portion 4h.

The wireless communication portion 4a conducts a wireless communication with the wireless base station 3 in accordance with a predetermined communication method, for example, by using CDM (Code Division Multiple Access), and modulates/demodulates sound signals and data signals. The key input portion 4b includes, for example, ten keys, an on-hook key, an off-hook key, a power key, a shutter button and a function selection button (a function key), and is used for operations of receiving various key inputs including dialing.

The CPU (Central Processing Unit) 4c controls overall operations of the mobile communication terminal 4 in accordance with predetermined system software. Moreover, when this CPU 4c detects that the power key of the above-described key input portion 4b keeps being pushed for a certain time, the CPU 4c downloads new system software by accessing the system software distribution server 1 which is connected to the communication network 2 via the wireless communication portion 4a. Details of this operation are described below.

The ROM 4d is a rewritable ROM such as EEPROM (Electronically Erasable and Programmable Read Only Memory), and stores the system software which is executed by the above-described CPU 4c and other nonvolatile data. Moreover, the RAM 4e is used as a working area for storing the system software downloaded in accordance with control by the above-described CPU 4c. The remaining battery power detection portion 4f detects remaining power in the battery 4g. The battery 4g supplies power to the overall mobile communication terminal 4. The display portion 4h is, for example, a liquid crystal display, and displays various messages, telephone numbers, images, and the like in accordance with control by the above-described CPU 4c.

Next, operations of the mobile communication terminal 4 of the first embodiment constituted as described above is explained.

Figure 3:
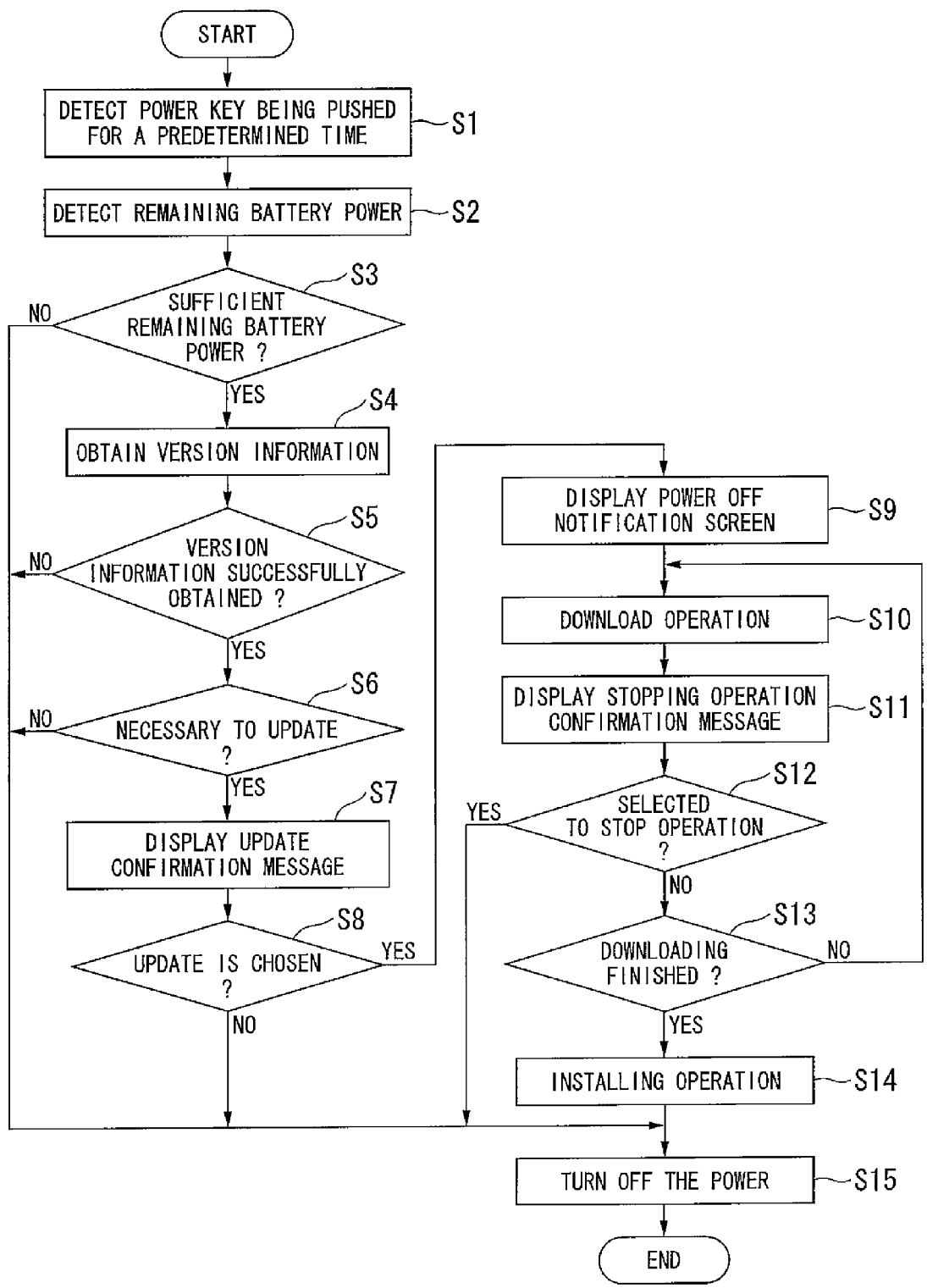
FIG. 3 is an operational flowchart of a mobile communication terminal of a first embodiment of the present invention.

FIG. 3 is an operational flowchart of the mobile communication terminal 4 of the first embodiment.

First, in a stand-by state, if the CPU 4c detects that the power key of the key input portion 4b is held down for a certain amount of time by the user, that is, if the CPU 4c detects a power off command by the user (Step S1), the CPU 4c obtains the value of remaining power in the battery 4g from the remaining battery power detection portion 4f (Step S2). After that, the CPU 4c determines whether or not the remaining power in the battery 4g is sufficient for downloading (Step S3). If the remaining power in the battery 4g is sufficient for downloading, the CPU 4c accesses the system software distribution server 1 via the wireless communication portion 4a and obtains version information of the system software stored in the system software distribution server 1 (Step S4). On the other hand, if the remaining power in the battery 4g is not sufficient for downloading, the CPU 4c skips to Step S15 in order to turn off the power of the mobile communication terminal 4 (end of operation of the system of the mobile communication terminal 4). As described above, the power of the mobile communication terminal 4 is turned off without downloading of the system software if the remaining power in the battery 4g is not sufficient for downloading. Therefore, it is possible to prevent an interruption in downloading because of a shortage of battery power while downloading.

Next, the CPU 4c determines whether or not the above-described version information is successfully obtained (Step S5). If the version information is successfully obtained, the CPU 4c compares the version information obtained from the above-described system software distribution server 1 to version information of the system software currently stored in the mobile communication terminal 4 in order to determine whether or not it is necessary to update the system software (Step S6). On the other hand, if the CPU 4c has failed to obtain the version information at Step S5, the CPU 4c skips to Step S15 in order to turn off the power of the mobile communication terminal 4. In the case of the failure to download the version information as described above, there is a high possibility that the user (that is, the mobile communication terminal 4) is at a position the radio wave cannot reach. Therefore, in such the case, downloading is not conducted.

Next, at Step S6, in a case in which the CPU 4c compares the version information obtained from the above-described system software distribution server 1 to version information of the system software currently stored in the mobile communication terminal 4, and if it is determined that the version information obtained from the above-described system software distribution server 1 is a new version, that is, in a case in which the CPU 4c determines that it is necessary to update the system software, the CPU 4c orders the display portion 4h to display messages such as "A new version of the program has been detected. Update the program?" and "YES/NO" as shown in FIG. 4(a) (Step S7). On the other hand, if the CPU 4c has detected that it is not necessary to update the system software at Step S6, the CPU 4c skips to Step S15 in order to turn off the power of the mobile communication terminal 4.

After that, the user sees the messages displayed at Step S7, and decides whether or not to update the system software. If the user requests to update the system software, the user operates the key input portion 4b in order to determine the update by moving the cursor to "YES" of the above-described messages, and the user does not requests to update the system software, the user operates the key input portion 4b so as to move the cursor to "NO" of the above-described messages. That is, the CPU 4c determines whether or not the user has decided to update the system software based on the operation of the key input portion 4b as described above (Step S8). In this Step S8, if "YES" is chosen by the user's operation as described above, the CPU 4c orders the display portion 4h to show a power off notification screen (a screen indicating end of operation of the system of the mobile communication terminal 4) as shown in FIG. 4(b) (Step S9). It should be noted that, even as described above, a screen which indicates end of operation of the system is shown to the user, but the system is still executing until the end of downloading of the system software as described below.

Subsequently, the CPU 4c starts downloading the system software from the system software distribution server 1 via the wireless communication portion 4a (Step S10). On the other hand, if the user chooses "NO" at Step S8, the CPU 4c skips to Step S15 in order to turn off the power of the mobile communication terminal 4.

After starting a download process at the above-described Step S10, the system software is divided into blocks which have a predetermined size and are distributed from the system software distribution server 1, and the CPU 4c sequentially stores the divided blocks in the RAM 4e. When the CPU 4c finishes downloading a certain number of blocks, the CPU 4c orders the display portion 4h to display messages such as "A new version of the program is being downloaded. Stop downloading?" and "YES/NO" as shown in FIG. 4(c) (Step S11).

The user sees the messages as described above and decides whether or not to stop downloading. If the user would like to stop downloading, the user operates the key input portion 4b so as to move the cursor to "YES" of the above-described messages. That is, the CPU 4c determines whether or not downloading is stopped based on the operation of the key input portion 4b as described above (Step S12). While an operation of stopping the download is not conducted, the CPU 4c continues downloading, and the CPU 4c repeats the operations of Steps S10-S13 until the download of the system software has been completed (Step S13).

After that, when downloading of the system software has been finished, the CPU 4c turns off the power of the mobile communication terminal 4 (Step S15) after installing to the ROM 4d (Step S14). On the other hand, if the user chooses to stop the download at Step S12, the CPU 4c stops downloading the system software removes the blocks of the system software which have been already stored in the RAM 4e, skips to Step S15 and turns off the power of the mobile communication terminal 4.

As described above, in accordance with the mobile communication terminal 4 of the first embodiment, the system software is downloaded when a command of turning off the power is received, that is, when the user has no intention to use the mobile communication terminal 4. Therefore, it is possible to complete downloading without preventing the user from operating. Moreover, the CPU 4c sends a command to display a screen to notify the end of operation of the system software (a power off notification screen). Therefore, even though download of the system software is conducted, it is possible to safely download because the user is notified not to operate the mobile communication terminal 4.

Moreover, it is necessary to reboot the system software after a download has been finished if the system software is updated. Therefore, in conventional techniques, it is necessary to end all application programs after downloading. However, the mobile communication terminal 4 of the first embodiment turns off the power after a download of the system software has been finished. Therefore, updating the system software is finished next time the power is turned on. In other words, a reboot is unnecessarily conducted, and it is possible to improve convenience of updating of the system software.

It should be noted that it is possible to omit Steps S7, S8, S11 and S12 of the operational flowchart of FIG. 3. In such a case, it is possible to automatically download and update the system software without being detected by the user.

(Second Embodiment)

Next, a second embodiment of the present invention is explained.

Figure 5:
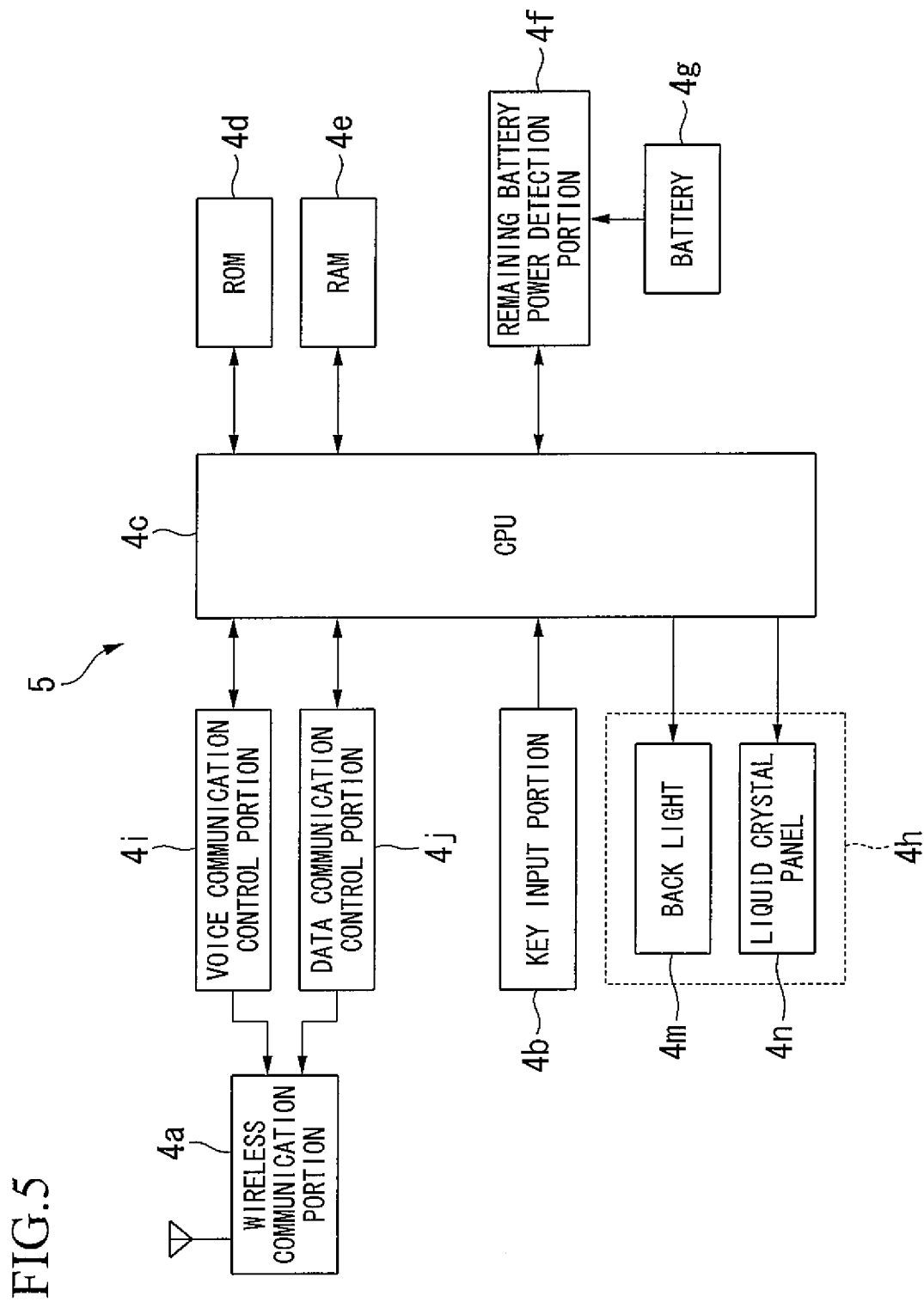
FIG. 5 is a constitutional block diagram of a mobile communication terminal of a second embodiment of the present invention.

FIG. 5 is a block diagram showing a constitution of a mobile communication terminal 5 of the second embodiment of the present invention. It should be noted that the same reference numerals are assigned to the same constitutional elements of FIG. 5 as FIG. 2.

As shown in FIG. 5, compared to the mobile communication terminal 4 of the first embodiment, the mobile communication terminal 5 of the second embodiment further provides a voice communication control portion 4i and a data communication control portion 4j. Moreover, the display portion 4h which is a liquid crystal display is constituted from a backlight 4m and a liquid crystal panel 4n.

A voice communication control portion 4i controls a voice communication function via the wireless communication portion 4a in accordance with the control of the CPU 4c. A data communication control portion 4j controls a data communication function of the wireless communication portion 4a in accordance with the control of the CPU 4c. In other words, the CPU 4c controls and activates the above-described voice communication control portion 4i when the CPU 4c conducts a voice communication via the wireless base station 3, and the CPU 4c controls and activates the above-described data communication control portion 4j when the CPU 4c conducts a data communication such as a download of system software via the wireless base station 3.

A backlight 4m is a light source of a liquid crystal panel 4n for supplying a predetermined quantity of light to the liquid crystal panel 4n, and is turned on/off based on a control of the CPU 4c. The liquid crystal panel 4n is, for example, a transmission liquid crystal panel of a normally white mode, and displays various messages, telephone numbers, images and the like according to a control of the CPU 4c.

Figure 6:
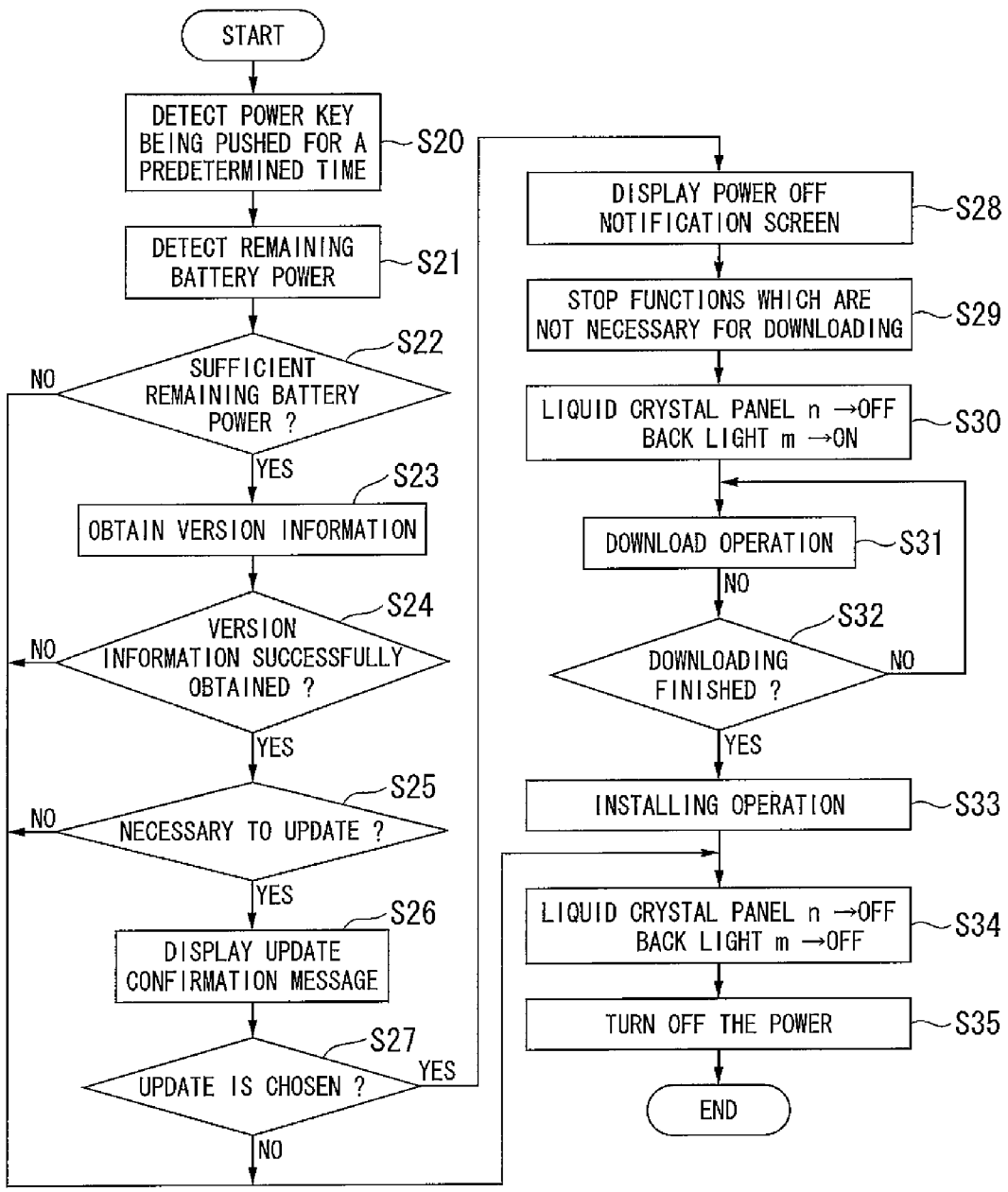
FIG. 6 is an operational flowchart of a mobile communication terminal of a second embodiment of the present invention.

Next, referring to a flowchart of FIG. 6, operations of the mobile communication terminal 5 of the second embodiment which is constituted in the above-described manner are explained.

First, while in a standby operation, if the CPU 4c detects that the power key of the key input portion 4b has been pushed for a predetermined amount of long time by the user, that is, if the CPU 4c detects the user's operation in order to turn off the power (Step S20), the CPU 4c obtains the value of remaining power in the battery 4g from the remaining battery power detection portion 4f (Step S21). After that, the CPU 4c determines whether or not the remaining power in the battery 4g is sufficient for downloading (Step S22). If the remaining power in the battery 4g is sufficient for downloading, the CPU 4c controls and activates the data communication control portion 4j in order to access the system software distribution server 1 via the wireless communication portion 4a, and obtains version information of the system software stored in the system software distribution server 1 (Step S23).

On the other hand, at above-described Step S22, if the CPU 4c detects that the remaining power in the battery 4g is not sufficient for downloading, the CPU 4c skips to Step S34, set a display shown on the liquid crystal panel 4n OFF, turns off the backlight 4m, and after that, turns off the power of the mobile communication terminal 6 (Step S35). It is possible to prevent the battery 4g from losing power and to prevent the download from being disrupted, because the power is turned off without downloading the system software if the remaining power in the battery 4g is not sufficient for downloading as described above.

Next, the CPU 4c determines whether or not it has succeeded in obtaining the above-described version information (Step S24). If it has succeeded in obtaining the version information, the CPU 4c compares the version information obtained from the above-described system software distribution server 1 and the version information currently stored in the mobile communication terminal 5 in order to determine whether or not it is necessary to update the system software (Step S25). On the other hand, if the CPU 4c detects that it has failed to obtain the version information at above-described Step S24, the CPU 4c skips to Step S34, set a display shown on the liquid crystal panel 4n OFF, turns off the backlight 4m, and after that, turns off the power of the mobile communication terminal 6 (Step S35). In the case of a failure to download the version information as described above, there is a high possibility in that the user (that is, the mobile communication terminal 5) is at a position where the radio waves cannot reach. Therefore, in such a case, downloading is not conducted.

Next, at Step S25, the CPU 4c compares the version information obtained from the above-described system software distribution server 1 and the version information currently stored in the mobile communication terminal 5. if it is determined that the version information obtained from the above-described system software distribution server 1 is a new version, that is, in the case in which the CPU 4c determines that it is necessary to update the system software, the CPU 4c orders the display portion 4h to display messages such as "A new version of the program has been detected. Update the program?" and "YES/NO" as shown in FIG. 4(a) (Step S26). On the other hand, if the CPU 4c detects that it is not necessary to update the system software at Step S25, the CPU 4c skips to Step S34, set a display shown on the liquid crystal panel 4n OFF, turns off the backlight 4m, and after that, turns off the power of the mobile communication terminal 6 (Step S35).

Figure 4:
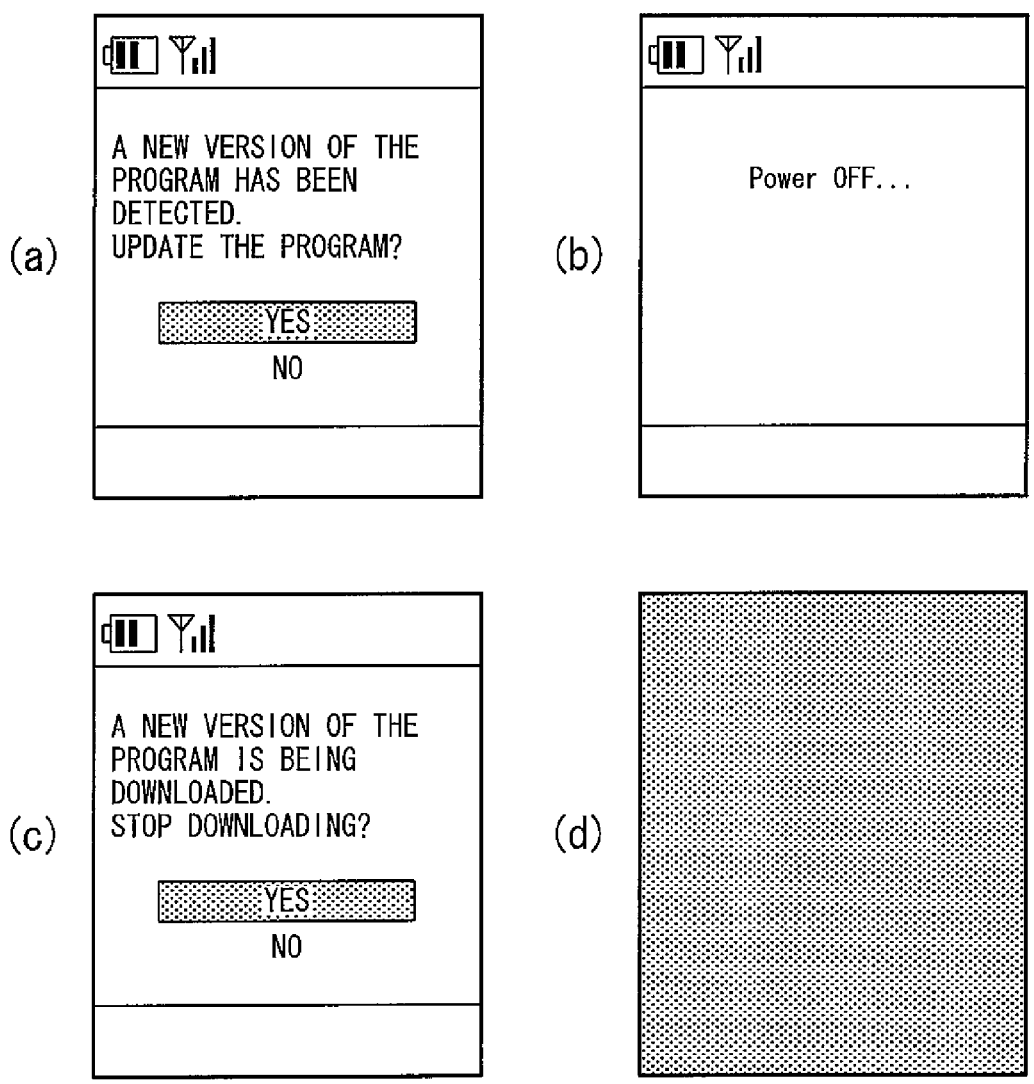
FIG. 4 is a drawing which shows a display state transition of a mobile communication terminal of a first embodiment of the present invention.

After that, the user see the messages displayed at Step S26, and detects whether or not the user has decided to update the system software. That is, the CPU 4c determines whether or not the update of the system software is chosen based on the operation of the key input portion 4b as described above (Step S27). In this Step S27, if "YES" is chosen by the user's operation, the CPU 4c orders the display portion 4h to show a power off notification screen (a screen indicating end of operation of the system of the mobile communication terminal 5) as shown in FIG. 4(*b*) (Step S28). It should be noted that, even as described above, a screen which indicates the end of operation of the system software is displayed, but the system is still active until the system software has been downloaded as described below.

Next, the CPU 4*c* stops functions which are not necessary for downloading the system software (Step S29). The functions which are not necessary for downloading the system software are, for example, voice communication functions, game application programs, alarms and music player functions. In the case of a terminal such as the mobile communication terminal 5 which can control both data communication and voice communication, there is a possibility that an incoming call of a voice communication is received while downloading. It is possible to prevent an interruption of an incoming call by stopping the voice communication control portion 4*i*. Moreover, as an effect which is simultaneously caused, it is possible to prevent wasteful power consumption because a periodic signal reception operation for checking an incoming call of voice communication is omitted while downloading. Furthermore, it is possible to more effectively prevent wasteful power consumption because functions which generate sounds such as alarms, music player functions, game application programs, and the like are stopped.

Moreover, the CPU 4*c* as shown in FIG. 4 (*d*), sets a display shown on the liquid crystal panel 4*n* to OFF. However, the CPU 4*c* maintains the backlight 4*m* in an On state (ON) (Step S30). As described above, functions which are not necessary for downloading the system software are stopped. However, the backlight 4*m* is turned on in order to show the user that the downloading operation is being conducted even though the liquid crystal panel 4 is turned off. It should be noted that the solution for notifying the user that the downloading operation is conducted is not limited to light the backlight 4*m* and it is possible to apply solutions such as lighting LED or showing a simple icon.

Subsequently, the CPU 4*c* activates the data communication control portion 4*j* and starts downloading the system software from the system software distribution server 1 (Step S31). On the other hand if the CPU 4*c* detects that the user has chosen the option of avoiding update of the system software at Step S27, the CPU 4*c* skips to Step S34, sets a display shown on the liquid crystal panel 4*n* OFF, turns off the backlight 4*m*, and after that, turns off the power of the mobile communication terminal 6 (Step S35).

After starting a download at the above-described Step S31, the system software is divided into blocks which have a predetermined size and are distributed from the system software distribution server 1, and the CPU 4*c* sequentially stores the divided blocks in the RAM 4*e*. After that, the CPU 4*c* determines whether or not downloading of the system software is finished (Step S32). If it is detected that downloading is not finished at Step S32, the operation of Step S31 is repeated.

On the other hand, at Step S32 described above, if it is detected that downloading of the system software is finished, the CPU 4*c* installs the system software stored in the RAM 4*e* to the ROM 4*d* (Step S33). After that, the CPU 4*c* sets a display shown on the liquid crystal panel 4*n* to OFF, turns off the backlight 4*m* (Step S34), and turns off the power of the mobile communication terminal 6 (Step S35). As described above, if downloading of the system software is finished, the backlight is turned off in order to indicate the end of downloading, the power of the mobile communication terminal 5 is turned off, and the operation of the system is finished.

As described above, in accordance with the mobile communication terminal 5 of the second embodiment, the system software is downloaded when a turn off command by the user is received, that is, when the user has no intention to use the mobile communication terminal 4. Therefore, it is possible to complete downloading without preventing the user form operating. Moreover, the CPU 4*c* sends a command to display a notification of the end of operation of the system software (a power off notification screen). Therefore, even though downloading of the system software is being conducted, it is possible to safely continue downloading because the user is notified not to operate the mobile communication terminal 5.

Moreover, functions which are not necessary for downloading the system software are stopped. Therefore, it is possible to prevent an interruption because of an incoming call and to decrease wasteful power consumption while downloading.

Moreover, as in the first embodiment, the mobile communication terminal 5 turns off the power after a download of the system software has been finished. Therefore, updating of the system software is finished when the power is turned on next time. In other words, a reboot is conducted unnecessarily, and it is possible to improve convenience of updating of the system software.

It should be noted that it is possible to omit Steps S26 and S27 of the operational flowchart of FIG. 6. In such a case, it is possible to full-automatically download and update the system software without being detected by the user.

(Third Embodiment)

Next, a third embodiment of the present invention is explained. It should be noted that a constitution of a mobile communication terminal of the third embodiment is the same as the mobile communication terminal 5 of the second embodiment. Therefore, an explanation of the mobile communication terminal is omitted.

There is a difference between the second and the third embodiments in that the second embodiment relates to a downloading operation of the mobile communication terminal (concretely related to the CPU 4*c*) in the case of a command to turn off is issued by the user. However, the third embodiment relates to a downloading operation without receiving a turning off command, that is, a downloading operation of the case in which the user operates in order to input commands of both an access to a system update site (the system software distribution server 1) and an update of the system software, or the case in which the mobile communication terminal 5 has a function of automatically and periodically obtaining the version information of the system software from the system software distribution server 1.

Figure 7:
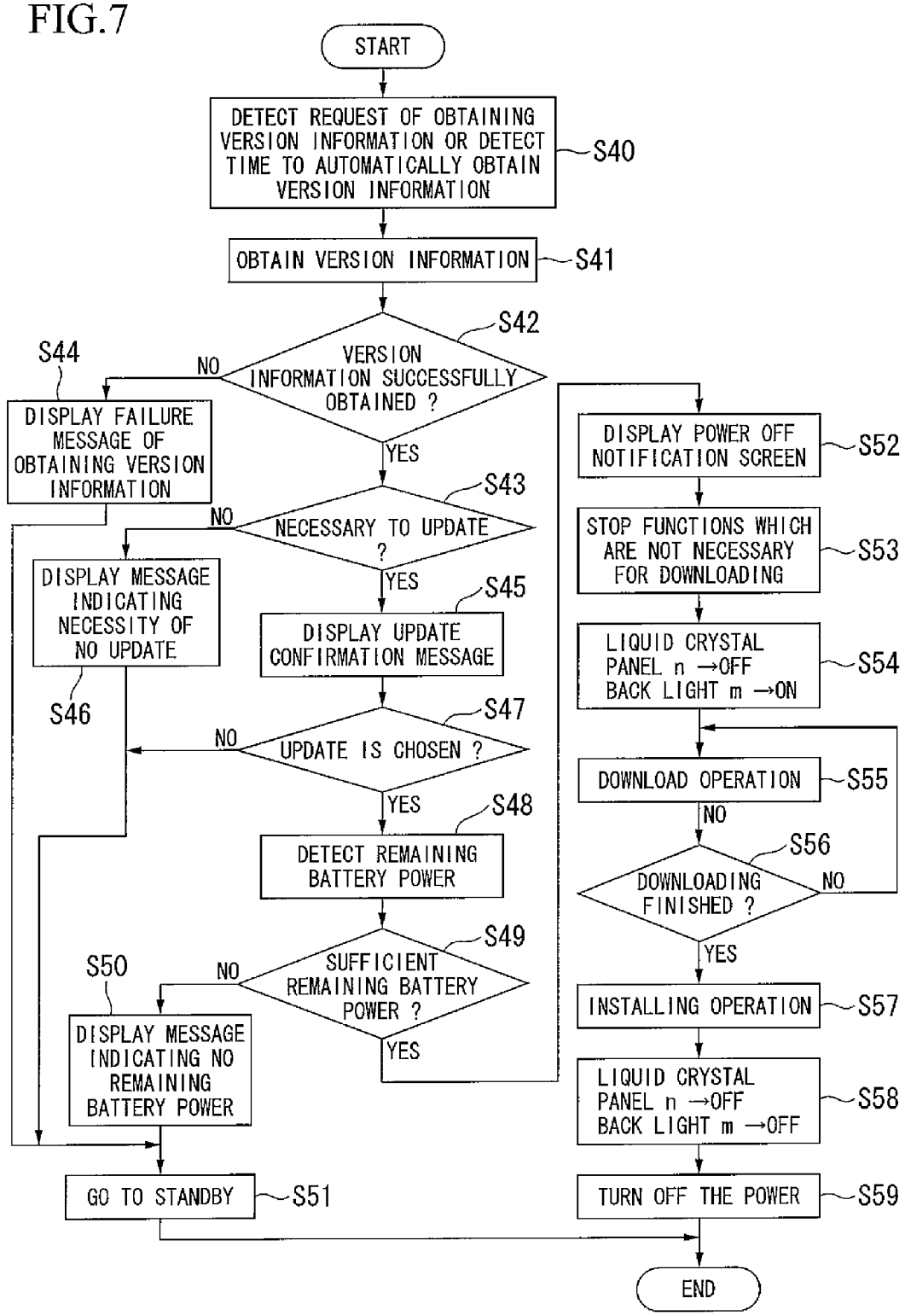
FIG. 7 is an operational flowchart of a mobile communication terminal of a third embodiment of the present invention.

Next, referring to the flowchart of FIG. 7, operations of the mobile communication terminal 5 of the third embodiment are explained.

Figure 8:
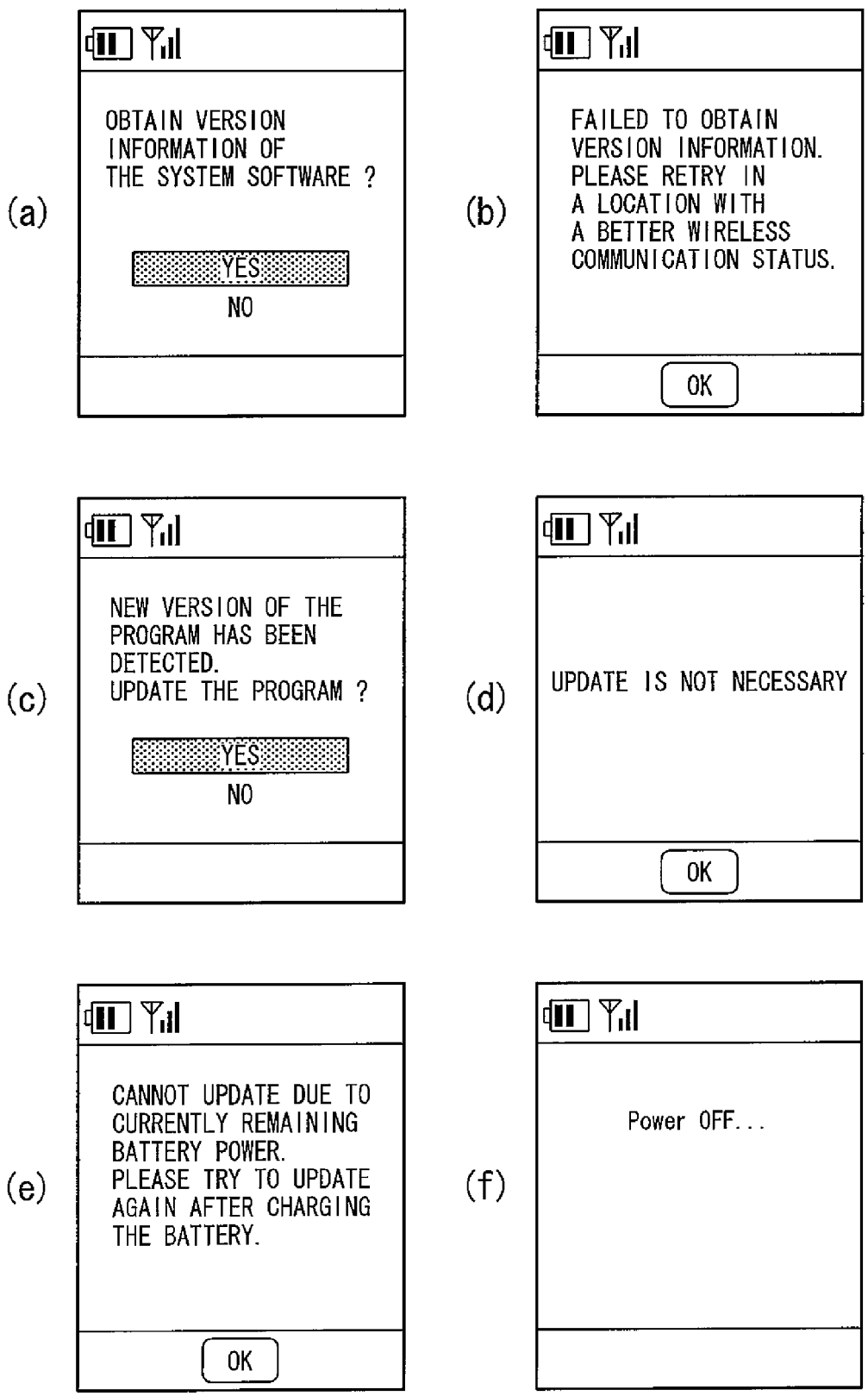
FIG. 8 is a drawing which shows a display state transition of a mobile communication terminal of a third embodiment of the present invention.

In the case in which the user operates the key input portion 4*b* in order to request an update of the system software while in a standby operation, or in the case in which the mobile communication terminal 5 has a function of automatically and periodically obtaining the version information of the system software and the time for obtaining the version information has arrived, the CPU 4*c* sends a command to the display portion 4*h* to display messages such as "Obtain version information of the system software?" and "YES/NO" as shown in FIG. 8(*a*) (Step S40).

If "YES" is chosen by the user's operation on the key input portion 4*b*, the CPU 4*c* controls and activates the data communication control portion 4*j* in order to access the system software distribution server 1 via the wireless communication portion 4*a*, and obtains version information of the system software stored in the system software distribution server 1 (Step S41). It should be noted that if "NO" is selected at Step S40, the CPU 4*c* goes to the standby operation.

Next, the CPU 4*c* determines whether or not it has succeeded in obtaining the above-described version information (Step S42). If it has succeeded to obtain the version information, the CPU 4*c* compares the version information obtained from the above-described system software distribution server 1 and the version information currently stored in the mobile communication terminal 5 in order to determine whether or not it is necessary to update the system software (Step S43). On the other hand, as shown in FIG. 8(*b*), if the CPU 4*c* detects that it has been failed to obtain the version information at above-described Step S42, the CPU 4*c* orders the display portion 4*h* in order to show a message "Failed to obtain version information. Please retry in a location with a better wireless communication status." (Step S44) and goes into standby (Step S51). In the case of failure of downloading the version information as described above, there is a high possibility that the user (that is, the mobile communication terminal 5) is at a position where the radio waves cannot reach. Therefore, in such a case, downloading is not conducted.

Next, at Step S43, the CPU 4*c* compares the version information obtained from the above-described system software distribution server 1 and the version information currently stored in the mobile communication terminal 5. if it is determined that the version information obtained from the above-described system software distribution server 1 is a new version, that is, in a case in which the CPU 4*c* determines that it is necessary to update the system software, the CPU 4*c* sends a command to the display portion 4*h* to display messages such as "New version of the program has been detected. Update the program? " and "YES/NO" as shown in FIG. 8(*c*) (Step S45). On the other hand, if the CPU 4*c* has detected that it is not necessary to update the system software at Step S43, the CPU 4*c* sends a command to the display portion 4*h* to show a message "Update is not necessary" as shown in FIG. 8(*d*) (Step S46) and goes to a standby operation (Step S51).

After that, the user see the messages displayed at Step S45, and decides whether or not there is a command inputted by the user to update the system software. The CPU 4*c* determines whether or not the update of the system software is chosen based on the operation of the key input portion 4*b* as described above (Step S47). If "NO" is selected at Step S47, the CPU 4*c* goes to the standby operation (Step S51).

On the other hand, in this Step S47, if "YES" is chosen by the user, the CPU 4*c* obtains a value of remaining power in the battery 4*g* from the remaining battery power detection portion 4*f* (Step S48) and determines whether or not the remaining power in the battery 4*g* is sufficient for downloading (Step S49). At Step S49, if the CPU 4*c* detects that the remaining power in the battery 4*g* is not sufficient for downloading, the CPU 4*c* sends a command to the display portion 4*h* to show a message such as "Cannot update due to currently remaining battery power Please try to update again after charging the battery" as shown in FIG. 8(*e*) (Step S50) and goes into standby (Step S51). It is possible to prevent the battery 4*g* from a shortage and to prevent the download from being disrupted, because the operation is changed to standby without downloading the system software if the remaining power in the battery 4*g* is not sufficient for downloading as described above.

On the other hand, in this Step S49, if the remaining power in the battery is not sufficient for downloading, the CPU 4*c* sends a command to the display portion 4*h* to show a power off notification screen (a screen indicating the end of operation of the system software of the mobile communication terminal 5) as shown in FIG. 8(*f*) (Step S52). It should be noted that, even as described above, a screen which indicates the end of operation of the system software is displayed to the user, but the system is still executing until download of the system software has been completed as described below.

Next, the CPU 4*c* stops functions which are not necessary for downloading the system software (Step S53). The functions which are not necessary for downloading the system software are the same as described in the second embodiment, and thus explanations are omitted. Moreover, the CPU 4*c* as shown in the second embodiment, sets a display shown on the liquid crystal panel 4*n* to OFF. However, the CPU 4*c* maintains the backlight 4*m* in a turned on state (ON) (Step S54). As described above, functions which are not necessary for downloading the system software are stopped. However, the backlight 4*m* is turned on in order to show the user that the downloading operation is being conducted.

Subsequently, the CPU 4*c* activates the data communication control portion 4*j* and starts downloading the system software from the system software distribution server 1 (Step S55). After starting downloading, the system software is divided into blocks which have a predetermined size and are distributed from the system software distribution server 1, and the CPU 4*c* sequentially stores the divided blocks in the RAM 4*e*. After that, the CPU 4*c* determines whether or not download of the system software is finished (Step S56). If it is detected that downloading has not finished at Step S56, the operation of Step S55 is repeated.

On the other hand, at Step S56 described above, if it is detected that downloading of the system software is finished, the CPU 4*c* installs the system software stored in the RAM 4*e* to the ROM 4*d* (Step S57). After that, the CPU 4*c* sets a display shown on the liquid crystal panel 4*n* to OFF, turns off the backlight 4*m* (Step S58), and turns off the power of the mobile communication terminal 6 (Step S59). As described above, if downloading of the system software is finished, the backlight is turned off in order to indicate the end of downloading, the power of the mobile communication terminal 5 is turned off, and the operation of the system is finished.

As described above, according to the third embodiment, even without receiving a turn-off command, it is possible to finish downloading while avoiding disturbances of the user's operation. Moreover, the CPU 4*c* sends a command to display a notification of the end of operation of the system (a power off notification screen). Therefore, even though downloading of the system software is conducted, it is possible to safety download because the user has been notified so as not to operate the mobile communication terminal 5.

Moreover, as in the second embodiment, functions which are not necessary for downloading the system software are stopped. Therefore, it is possible to prevent an interruption because of an incoming call and to decrease wasteful power consumption while downloading.

Moreover, as in the first and second embodiments, the mobile communication terminal 5 turns off the power after a download of the system software has been finished. Therefore, updating of the system software is finished the next time the power is turned. In other words, a reboot is not necessary, and it is possible to improve convenience of updating of the system software.

In the above-described first through third embodiments, downloading of the system software is explained. However, it should be noted that it is not limited to the system software and it is possible to download other application software and the like which need to be updated by applying the same methods.

Preferable embodiments of the present invention are explained above. However, the present invention is not limited to the above-described embodiments. It is possible to apply additions, omissions and replacement of constitutional elements within the scope of the present invention. The scope of the present invention is not limited by the descriptions above, and is limited only by the attached claims.

INDUSTRIAL APPLICABILITY

According to the present invention, it is possible to complete downloading without preventing the user form operating the mobile terminal, and even though download of the system software is conducted, it is possible to safely download because a display for notifying the end of operation of the system is shown and the user is notified not to operate the mobile communication terminal.

The invention claimed is:

1. A communication terminal comprising:
a wireless receiver; and
a controller configured to download software via the wireless receiver from a software distribution apparatus connected to a network, wherein
the controller is further configured to:
detect an instruction of power-off from a user,
determine whether a new version software is available after detecting the instruction of power-off, and
download the new version software after determining that the new version software is available in a state in which power is supplied without interruption, the power supplied without interruption from the detection of the instruction of power-off from the user until the end of downloading the new version software, and after the end of downloading the new version software the controller turns the power off.

2. A communication terminal according to claim 1, wherein the controller downloads the new version software prior to power to the communication terminal being turned off after a command is received to turn off power.

3. A communication terminal according to claim 1, wherein the controller downloads the new version software when a decision operation to update the software is conducted after accessing a software update site.

4. A communication terminal according to claim 1, wherein the controller downloads the new version software when a decision operation to update the software is conducted after receiving a notification of new software.

5. A communication terminal according to claim 1, wherein the controller shows a screen indicating end of operations of a system of the communication terminal when an update operation is conducted by using the downloaded new version software and stops a function of detecting an incoming call.

6. A communication terminal according to claim 1, wherein the controller shows a screen indicating end of operations of a system of the communication terminal when an update operation is conducted by using the downloaded new version software and stops a function of generating sounds.

7. A communication terminal according to claim 1, further comprising a remaining battery power detection portion which detects remaining power of a battery, wherein
the controller downloads the new version software if the controller detects that the remaining power is sufficient for downloading.

8. A communication terminal according to claim 1, wherein the controller finishes operations of the system of the communication terminal after a download of the new version software has been finished.

9. A communication terminal according to claim 1, wherein the software is system software.

10. A communication terminal according to claim 1, wherein a screen indicating the power off is shown on the basis of a software version update to the software being conducted by using the downloaded new version software.

11. A communication terminal according to claim 1, wherein the controller starts downloading the new version software after the controller detects the instruction of power-off and displays a screen indicating a power off message of the communication terminal.

12. A communication terminal according to claim 1, wherein the controller stops functions which are not necessary for downloading the new version software before the controller starts downloading the new version software, in response to detecting the instruction of power-off.

13. A communication terminal according to claim 1, wherein the controller starts downloading the new version software in response to detecting the instruction of power-off.

14. A method for updating software, comprising:
detecting an instruction of power-off from a user;
determining whether new version software is available after detecting the instruction of power-off;
after determining that the new version software is available, downloading the new version software via wireless communication from a software distribution apparatus which is connected to a communication network; and
downloading the new version software in a state in which power is supplied without interruption, the power supplied without interruption from the detection of the instruction of power-off from the user until the end of downloading the new version software, and after the end of downloading the new version software controller turns the power off.

15. A software updating method according to claim 14, wherein the new version software is downloaded prior to power to the communication terminal being turned off after a turn-off command is received.

16. A software updating method according to claim 14, wherein the new version software is downloaded if a decision operation of updating the software is conducted after accessing a software update site.

17. A software updating method according to claim 14, wherein the new version software is downloaded when a decision operation of updating the software is conducted after receiving a notification of new software.

18. A software updating method according to claim 14, wherein, when an update operation is conducted by using the downloaded new version software, a screen indicating end of operations of a system of the communication terminal is displayed and a function of detecting an incoming call is stopped.

19. A software updating method according to claim 14, wherein a screen indicating end of operations of a system of the communication terminal is shown when an update operation is conducted by using the downloaded new version software and a function of generating sounds is stopped.

20. A software updating method according to claim 14, wherein, the new version software is downloaded if remaining power of a battery is sufficient for downloading the new version software.

21. A software updating method according to claim 14, wherein, operations of the system of the communication terminal are finished after a download of the new version software has been finished.

22. A software updating method according to claim 14, wherein the software is system software.

23. A software updating method according to claim 14, wherein a screen indicating the power off is shown on the basis of a software version update to the software being conducted by using the downloaded new version software.

24. A software updating method according to claim 14, wherein downloading the new version software is after detecting the instruction of power-off and displaying a screen indicating a power off message of the communication terminal.

* * * * *